3,082,148
Patented Mar. 19, 1963

3,082,148
INSECTICIDAL PHOSPHONOTHIOATES
Joseph W. Baker, Kirkwood, Peter E. Newallis, Crestwood, and John P. Chupp, Kirkwood, Mo., assignors to Monsanto Chemical Company, St. Louis, Mo., a corporation of Delaware
No Drawing. Filed Mar. 6, 1961, Ser. No. 93,311
20 Claims. (Cl. 167—30)

This invention relates to novel O-(aryl) phosphonothioates and to the preparation of same. Additionally this invention relates to insecticidal compositions containing these novel O-(aryl) phosphonothioates as an active ingredient.

The O-(aryl) phosphonothioates of this invention can be represented by the structure

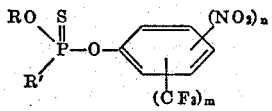

wherein $m$ and $n$ are whole numbers from 1 to 2 and wherein the sum of $m$ and $n$ (i.e. $m+n$) is a whole number from 2 to 3, wherein R' is a hydrocarbyl radical containing from 1 to 8 carbon atoms, and wherein R is a hydrocarbon radical containing from 1 to 8 carbon atoms.

As illustrative of hydrocarbon radicals, i.e. R, are phenyl, tolyl, xylyl, ethylphenyl, benzyl, phenethyl, cyclohexyl, cyclopentyl, cycloheptyl, methylcyclohexyl, methyl, ethyl, propyl, butyl, amyl, hexyl, heptyl, octyl, allyl, methallyl, ethallyl, butenyl, pentenyl, propargyl, butynyl, and the various isomeric aryl, alkaryl, aralkyl, cycloalkyl, alkyl, alkenyl, alkynyl, etc., forms thereof containing up to 8 carbon atoms.

As illustrative of hydrocarbyl radicals, i.e. R', are phenyl, tolyl, xylyl, ethylphenyl, benzyl, phenethyl, cyclohexyl, methylcyclohexyl, cyclopentyl, cycloheptyl, methyl, ethyl, propyl, butyl, amyl, hexyl, heptyl, octyl, and the various isomeric aryl, alkaryl, aralkyl, cycloalkyl, alkyl, etc. forms thereof containing up to 8 carbon atoms and which are free of olefinic and acetylenic unsaturation.

The method of this invention comprises reacting

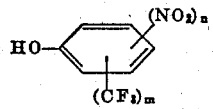

wherein $m$ and $n$ have the aforedescribed significance with

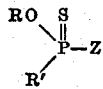

wherein R and R' have the aforedescribed significance and wherein Z is a halogen of atomic number in the range of 16 to 36 (i.e. chlorine or bromine, preferably chlorine) in the presence of one or more hydrogen halide scavenging agent.

As illustrative of the hydroxy substituted reactants of the method of this invention are 2-nitro-4-trifluoromethylphenol, 2,6-dinitro-4-trifluoromethylphenol, 2-nitro-5-trifluoromethylphenol, 2,4-dinitro-5-trifluoromethylphenol, 3-nitro-5-trifluoromethylphenol, 2-nitro-3-trifluoromethylphenol, 3-trifluoromethyl-4-nitrophenol, etc. Usually the hydroxy substituted reactant will be 3-trifluoromethyl-4-nitrophenol.

As illustrative of the halide reactants of the method of this invention are O-ethyl methylphosphonochloridothionate, O-(n-propyl) ethylphosphonochloridothionate, O-(n-butyl) methylphosphonochloridothionate, O-methyl cyclohexylphosphonobromidothionate, O-ethyl benzylphosphonobromidothionate, O-ethyl phenylphosphonochloridothionate, O-ethyl isobutyl phosphonochloridothionate, O-allyl ethylphosphonochloridothionate, O-allyl n-propylphosphonochloridothionate, O-phenyl methylphosphonochloridothionate, O-cyclohexyl ethylphosphonochloridothionate, O-(n-propyl) n-butylphosphonobromidothionate, O-benzyl ethylphosphonochloridothionate, O-propargyl methylphosphonochloridothionate, O-(n-butyl) ethylphosphonochloridothionate, O-methyl methylphosphonochloridothionate, O-phenyl ethylphosphonochloridothionate, O-allyl ethylphosphonochloridothionate, O-octyl methylphosphonochloridothionate, etc.

As illustrative of hydrogen halide scavenging agents of the method of this invention are sodium carbonate, potassium carbonate, the tertiary amines such as triethylamine, tripropylamine, tributylamine, dimethylaniline, lutidine, pyridine, 1-pipecoline, etc. These scavenging agents will be employed ordinarily in an amount at least sufficient to absorb the hydrogen halide by-product of the reaction. They can be added at the beginning of the reaction or throughout the course of the reaction.

Where and when desired an inert organic liquid or solvent (e.g. benzene, toluene, xylene, acetone, butanone, dioxane, etc.) can be used in the method of this invention.

While a wide range of reaction temperatures can be employed provided the system is fluid (i.e. a reaction temperature above the freezing point of the system up to and including the boiling point of the system) it is preferred to employ a reaction temperature in the range of from about 10° C. to about 120° C. In general the hydroxy substituted reactant and the hydrocarbylphosphonohalidothionate reactant will be employed in substantially equimolecular amounts.

As illustrative of the preparation of the phosphonothioates of this invention but not limitative thereof is the following:

EXAMPLE I

To a suitable reaction vessel equipped with a thermometer, agitator and reflux condenser is charged approximately 88 parts by weight of benzene, approximately 12.4 parts by weight (substantially 0.06 mole) of 3-trifluoromethyl-4-nitrophenol, approximately 6.1 parts by weight (substantially 0.06 mole) of triethylamine, and approximately 9.5 parts by weight (substantially 0.06 mole) of O-ethyl methylphosphonochloridothionate. While agitating the mixture is heated up to the reflux temperature and then refluxed for 5 hours. The reaction mass is then cooled to room temperature and then quenched with water. The organic layer is separated and washed first with aqueous 3% sodium carbonate and then with water. The so-washed solution is then stripped of volatiles under vacuum. The residue, an oil, is O-ethyl O-(3-trifluoromethyl-4-nitrophenyl) methylphosphonothioate.

EXAMPLE II

Employing the procedure of Example I but replacing O-ethyl methylphosphonochloridothionate with a substantially equimolecular amount of O-methyl ethylphosphonobromidothionate there is obtained O-methyl O-(3-trifluoromethyl-4-nitrophenyl) ethylphosphonothioate which is insoluble in water.

EXAMPLE III

To a suitable reaction vessel equipped with a thermometer, agitator and reflux condenser is charged approximately 105 parts by weight of benzene, approximately 14.5 parts by weight (substantially 0.07 mole) of 3-trifluoromethyl-4-nitrophenol, approximately 7.1 parts by weight (substantially 0.07 mole) of triethylamine, and approximately 14.5 parts by weight (substantially 0.07 mole) of O-(n-butyl) methylphosphonochloridothionate.

While agitating the mixture is heated up to the reflux temperature and then refluxed for 6 hours. The reaction mass is then cooled to room temperature and then quenched with water. The organic layer is separated and washed first with aqueous 3% sodium carbonate and then with water. The so-washed solution is then stripped of volatiles under vacuum. The residue, an oil, is O-(n-butyl) O-(3-trifluoromethyl-4-nitrophenyl) methylphosphonothioate. *Analysis.*—Theory: 8.7% P, 9.0% S, 3.9% N. Found: 8.4% P, 9.1% S, 3.9% N.

EXAMPLE IV

Employing the procedure of Example III but replacing O-(n-butyl) methylphosphonochloridothionate with an equimolecular amount of O-allyl ethylphosphonochloridothionate there is obtained O-allyl O-(3-trifluoromethyl-4-nitrophenyl) ethylphosphonothioate which is water-insoluble.

EXAMPLE V

To a suitable reaction vessel equipped with a thermometer, agitator and reflux condenser is charged approximately 132 parts by weight of benzene, approximately 10.4 parts by weight (substantially 0.05 mole) of 3-trifluoromethyl-4-nitrophenol, approximately 5.1 parts by weight (substantially 0.05 mole) of triethylamine, and approximately 10.6 parts by weight (substantially 0.05 mole) of O-cyclohexyl methylphosphonochloridothionate. While agitating the mixture is heated up to the reflux temperature and then refluxed for 8 hours. The reaction mass is then cooled to room temperature and then quenched with water. The organic layer is separated and washed first with aqueous 3% sodium carbonate and then with water. The so-washed solution is then stripped of volatiles under vacuum. The residue, an oil, is O-cyclohexyl O-(3-trifluoromethyl-4-nitrophenyl) methylphosphonothioate. *Analysis.*—Theory: 8.0% P, 3.6 N. Found: 7.9% P, 3.4% N.

EXAMPLE VI

Employing the procedure of Example V but replacing 3-trifluoromethyl-4-nitrophenol with an equimolecular amount of 3-nitro-5-trifluoromethylphenol there is obtained O-cyclohexyl O-(3-nitro-5-trifluoromethylphenyl) methylphosphonothioate which is insoluble in water.

EXAMPLE VII

To a suitable reaction vessel equipped with a thermometer, agitator and reflux condenser is charged approximately 132 parts by weight of benzene, approximately 10.4 parts by weight (substantially 0.05 mole) of 3-trifluoromethyl-4-nitrophenol, approximately 5.1 parts by weight (substantially 0.05 mole) of triethylamine, and approximately 10.2 parts by weight (substantially 0.05 mole) of O-(n-hexyl) methylphosphonochloridothionate. While agitating the mixture is heated up to the reflux temperature and then refluxed for 6 hours. The reaction mass is then cooled to room temperature and then quenched with water. The organic layer is separated and washed first with aqueous 3% sodium carbonate and then with water. The so-washed solution is then stripped of volatiles under vacuum. The residue, an oil, is O-(n-hexyl) O-(3-trifluoromethyl-4-nitrophenyl) methylphosphonothioate. *Analysis.*—Theory: 8.1% P, 8.3% S, 3.6% N. Found: 8.0% P, 8.5% S, 3.4% N.

EXAMPLE VIII

Employing the procedure of Example VII but replacing O-(n-hexyl) methylphosphonochloridothionate with an equimolecular amount of O-isoamyl ethylphosphonochloridothionate there is obtained O-isoamyl O-(3-trifluoromethyl-4-nitrophenyl) ethylphosphonothioate which is insoluble in water.

EXAMPLE IX

To a suitable reaction vessel equipped with a thermometer, agitator and reflux condenser is charged approximately 132 parts by weight of benzene, approximately 16.8 parts by weight (substantially 0.08 mole) of 3-trifluoromethyl-4-nitrophenol, approximately 8.3 parts by weight (substantially 0.08 mole) of triethylamine, and approximately 13.6 parts by weight (substantially 0.08 mole) of O-isopropyl methylphosphonochloridothionate. While agitating the mixture is heated up to the reflux temperature and then refluxed for 8 hours. The reaction mass is then cooled to room temperature and then quenched with water. The organic layer is separated and washed first with aqueous 3% sodium carbonate and then with water. The so-washed solution is then stripped of volatiles under vacuum. The residue, an oil, is O-isopropyl O-(3-trifluoromethyl-4-nitrophenyl) methylphosphonothioate. *Analysis.*—Theory: 4.1% N. Found: 4.2% N.

EXAMPLE X

Employing the procedure of Example IX but replacing O-isopropyl methylphosphonochloridothionate with an equimolecular amount of O-(n-propyl) phenylphosphonochloridothionate there is obtained O-(n-propyl) O-(3-trifluoromethyl-4-nitrophenyl) phenylphosphonothioate.

EXAMPLE XI

To a suitable reaction vessel equipped with a thermometer, agitator and reflux condenser is charged approximately 132 parts by weight of benzene, approximately 12.4 parts by weight (substantially 0.06 mole) of 3-trifluoromethyl-4-nitrophenol, approximately 6.6 parts by weight (substantially 0.065 mole) of triethylamine, and approximately 12.4 parts by weight (substantially 0.06 mole) of O-ethyl ethylphosphonochloridothionate. While agitating the mixture is heated up to the reflux temperature and then refluxed for 5 hours. The reaction mass is then cooled to room temperature and then quenched with water. The organic layer is separated and washed first with aqueous 3% sodium carbonate and then with water. The so-washed solution is then stripped of volatiles under vacuum. The residue, an oil, is O-ethyl O-(3-trifluoromethyl-4-nitrophenyl) ethylphosphonothioate. *Analysis.*—Theory: 9.0% P, 4.1% N, 9.3% S. Found: 8.9% P, 4.0% N, 8.9% S.

EXAMPLE XII

Employing the procedure of Example XI but replacing O-ethyl ethylphosphonochloridothionate with an equimolecular amount of O-ethyl benzylphosphonobromidothionate there is obtained O-ethyl O-(3-trifluoromethyl-4-nitrophenyl) benzylphosphonothioate which is insoluble in water.

EXAMPLE XIII

To a suitable reaction vessel equipped with a thermometer agitator and reflux condenser is charged approximately 88 parts by weight of benzene, approximately 10.4 parts by weight (substantially 0.05 mole) of 3-trifluoromethyl-4-nitrophenol, approximately 5.1 parts by weight (substantially 0.05 mole) of triethylamine, and approximately 9.4 parts by weight (substantially 0.05 mole) of O-isobutyl methylphosphonochloridothionate. While agitating the mixture is heated up to the reflux temperature and then refluxed for 6 hours. The reaction mass is then cooled to room temperature and then quenched with water. The organic layer is separated and washed first with aqueous 3% sodium carbonate and then with water. The so-washed solution is then stripped of volatiles under vacuum. The residue, an oil, is O-isobutyl O-(3-trifluoromethyl-4-nitrophenyl) methylphosphonothioate. *Analysis.*—Theory: 8.7% P, 9.0% S, 3.9% N. Found: 8.9% P, 9.1% S, 4.0% N.

EXAMPLE XIV

Employing the procedure of Example XIII but replacing O-isobutyl methylphosphonochloridothionate with an equimolecular amount of O-phenyl n-butylphosphonochloridothionate there is obtained O-phenyl O-(3-trifluoromethyl-4-nitrophenyl) n-butylphosphonothioate which is insoluble in water.

EXAMPLE XV

To a suitable reaction vessel equipped with a thermometer, agitator and reflux condenser is charged approximately 132 parts by weight of benzene, approximately 12.4 parts by weight (substantially 0.06 mole) of 3-trifluoromethyl-4-nitrophenol, approximately 6.1 parts by weight (substantially 0.06 mole) of triethylamine, and approximately 10.3 parts by weight (substantially 0.06 mole) of O-(n-propyl) methylphosphonochloridothionate. While agitating the mixture is heated up to the reflux temperature and then refluxed for 12 hours. The reaction mass is then cooled to room temperature and then quenched with water. The organic layer is separated and washed first with aqueous 3% sodium carbonate and then with water. The so-washed solution is then stripped of volatiles under vacuum. The residue, an oil, is O-(n-propyl) O-(3-trifluoromethyl-4-nitrophenyl) methylphosphonothioate. *Analysis.*—Theory: 9.1% P, 4.1% N, 9.3% S. Found: 9.0% P, 3.9% N, 9.2% S.

EXAMPLE XVI

Employing the procedure of Example XV but replacing O-(n-propyl) methylphosphonochloridothionate with an equimolecular amount of O-methyl n-propylphosphonochloridothionate there is obtained O-methyl O-(3-trifluoromethyl-4-nitrophenyl) n-propylphosphonothioate which is water-insoluble.

EXAMPLE XVII

To a suitable reaction vessel equipped with a thermometer, agitator and reflux condenser is charged approximately 88 parts by weight of benzene, approximately 10.1 parts by weight (substantially 0.05 mole) of 3-trifluoromethyl-4-nitrophenol, approximately 5.1 parts by weight (substantially 0.05 mole) of triethylamine, and approximately 10.4 parts by weight (substantially 0.05 mole) of O-(n-amyl) methylphosphonochloridothionate. While agitating the mixture is heated up to the reflux temperature and then refluxed for 6 hours. The reaction mass is then cooled to room temperature and then quenched with water. The organic layer is separated and washed first with aqueous 3% sodium carbonate and then with water. The so-washed solution is then stripped of volatiles under vacuum. The residue, an oil, is O-(n-amyl) O-(3-trifluoromethyl-4-nitrophenyl) methylphosphonothioate. *Analysis.*—Theory: 8.4% P, 8.6% S, 3.8% N. Found: 8.5% P, 8.4% S, 3.5% N.

EXAMPLE XVIII

Employing the procedure of Example XVII but replacing O-(n-amyl) methylphosphonochloridothionate with an equimolecular amount of O-allyl methylphosphonochloridothionate there is obtained O-allyl O-(3-trifluoromethyl-4-nitrophenyl) methylphosphonothioate which is insoluble in water.

EXAMPLE XIX

To a suitable reaction vessel equipped with a thermometer, agitator and reflux condenser is charged approximately 88 parts by weight of benzene, approximately 10.4 parts by weight (substantially 0.05 mole) of 3-trifluoromethyl-4-nitrophenol, approximately 6.1 parts by weight (substantially 0.06 mole) of triethylamine, and approximately 10.0 parts by weight (substantially 0.05 mole) of O-(n-butyl ethylphosphonochloridothionate. While agitating the mixture is heated up to the reflux temperature and then refluxed for 5 hours. The reaction mass is then cooled to room temperature and then quenched with water. The organic layer is separated and washed first with aqueous 3% sodium carbonate and then with water. The so-washed solution is then stripped of volatiles under vacuum. The residue, an oil, is O-(n-butyl) O-(3-trifluoromethyl-4-nitrophenyl) ethylphosphonothioate.

EXAMPLE XX

Employing the procedure of Example XIX but replacing O-(n-butyl) ethylphosphonochloridothionate with an equimolar amount of O-(n-propyl) cyclohexylphosphonochloridothionate there is obtained O-(n-propyl) O - (3 - trifluoromethyl - 4 - nitrophenyl) cyclohexylphosphonothioate.

EXAMPLE XXI

To a suitable reaction vessel equipped with a thermometer, agitator and reflux condenser is charged approximately 132 parts by weight of benzene, approximately 10.4 parts by weight (substantially 0.05 mole) of 3-trifluoromethyl-4-nitrophenol, approximately 5.1 parts by weight (substantially 0.05 mole) of triethylamine, and approximtaely 10.3 parts by weight (substantially 0.05 mole) of O-phenyl methylphosphonochloridothionate. While agitating the mixture is heated up to the reflux temperature and then refluxed for 6 hours. The reaction mass is then cooled to room temperature and then quenched with water. The organic layer is separated and washed first with aqueous 3% sodium carbonate and then with water. The so-washed solution is then stripped of volatiles under vacuum. The residue, an oil, is O-phenyl O-(3-trifuoromethyl-4-nitrophenyl) methylphosphonothioate. *Analysis.*—Theory: 8.2% P, 8.5% S, 3.7% N. Found 8.2% P, 8.5% S, 3.6% N.

EXAMPLE XXII

To a suitable reaction vessel equipped with a thermometer, agitator and reflux condenser is charged approximately 132 parts by weight of benzene, approximately 12.6 parts by weight (substantially 0.06 mole) of 3-trifluoromethyl-4-nitrophenol, approximately 6.2 parts by weight (substantially 0.06 mole) of triethylamine, and approximately 13.1 parts by weight (substantially 0.06 mole) of O-ethyl phenylphosphonochloridothionate. While agitating the mixture is heated up to the reflux temperature and then refluxed for 6 hours. The reaction mass is then cooled to room temperature and then quenched with water. The organic layer is separated and washed first with aqueous 3% sodium carbonate and then with water. The so-washed solution is then stripped of volatiles under vacuum. The residue, an oil, is O-ethyl O-(3-trifluoro-4-methylphenyl) phenylphosphonothioate. *Analysis.*—Theory: 7.9% P, 8.2% S, 3.6% N. Found: 7.8% P, 8.6% S, 3.6% N.

EXAMPLE XXIII

Employing the procedure of Example XXII but replacing O-ethyl phenylphosphonochloridothionate with an equimolecular amount of O-(n-propyl) ethylphosphonochloridothionate there is obtained O-(n-propyl) O-(3-trifluoromethyl-4-nitrophenyl) ethylphosphonothioate which is insoluble in water.

EXAMPLE XXIV

To a suitable reaction vessel equipped with a thermometer, agitator and reflux condenser is charged approximately 88 parts by weight of benzene, approximately 12.4 parts by weight (substantially 0.06 mole) of 2-trifluoromethyl-4-nitrophenol, approximately 6.1 parts by weight (substantially 0.06 mole) of triethylamine, and approximately 9.5 parts by weight (substantially 0.06 mole) of O-ethyl methylphosphonochloridothionate. While agitating the mixture is heated up to the reflux temperature and then refluxed for 5 hours. The reaction mass is then cooled to room temperature and then quenched with water. The organic layer is separated and washed first with aqueous 3% sodium carbonate and then with water. The so-washed solution is then stripped of volatiles under vacuum. The residue is O-ethyl O-(2-trifluoromethyl-4-nitrophenyl) methylphosphonothioate.

EXAMPLE XXV

To a suitable reaction vessel equipped with a thermometer, agitator and reflux condenser is charged approximately 88 parts by weight of benzene, approximately 12.4 parts by weight(substantially 0.06 mole) of 5-trifluoromethyl-3-nitrophenol, approximately 6.1 parts by weight (substantially 0.06 mole) of triethylamine, and approximately 9.5 parts by weight (substantially 0.06 mole) of O-ethyl methylphosphonochloridothionate. While agitating the mixture is heated up to the reflux temperature and then refluxed for 5 hours. The reaction mass is then cooled to room temperature and then quenched with water. The organic layer is separated and washed first with aqueous 3% sodium carbonate and then with water. The so-washed solution is then stripped of volatiles under vacuum. The residue is O-ethyl O-(5-trifluoromethyl-3-nitrophenyl) methylphosphonothioate.

EXAMPLE XXVI

To a suitable reaction vessel equipped with a thermometer, agitator and reflux condenser is charged approximately 88 parts by weight of benzene, approximately 12.9 parts by weight of 2,4-dinitro-5-trifluoromethylphenol, approximately 6.1 parts by weight of triethylamine, and approximately 9.5 parts by weight of O-ethyl methylphosphonochloridothionate. While agitating the mixture is heated up to the reflux temperature and then refluxed for 5 hours. The reaction mass is then cooled to room temperature and then quenched with water. The organic layer is separated and washed first with aqueous 3% sodium carbonate and then with water. The so-washed solution is then stripped of volatiles under vacuum. The residue is O-ethyl O-(2,4-dinitro-5-trifluoromethylphenyl) methylphosphonothioate.

EXAMPLE XXVII

Employing the procedure of Example XXII but replacing O-ethyl phenylphosphonochloridothionate with an equimolecular amount of O-ethyl benzylphosphonochloridothionate there is obtained O-ethyl O-(3-trifluoromethyl-4-nitrophenyl) benzylphosphonothioate which is insoluble in water.

The methods by which the phosphonothioates of this invention are isolated will vary slightly with the reactants employed and the product produced. Further purification by selective solvent extraction or by absorptive agents such as activated carbon or clays can precede the removal of the inert organic liquid or solvent when such is employed. Additionally an inert organic solvent can be added to and in the purification by absorptive agents. However, the product is generally satisfactory for insecticidal purposes without further purification.

Of the phosphonothioates of this invention a particularly useful group are those of the formula

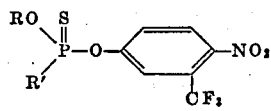

wherein R' is phenyl (i.e. $C_6H_5$) or an alkyl radical containing from 1 to 4 carbon atoms and wherein R is an aliphatic hydrocarbon radical containing from 1 to 5 carbon atoms, the alpha-carbon of said R having two hydrogen substituents (i.e. primary carbon, $-CH_2-$). Of this group those of the formula

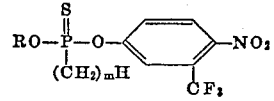

wherein $m$ is a whole number from 1 to 2 and wherein R is a primary alkyl radical containing from 2 to 4 carbon atoms are particularly desirable.

It will be understood that the terms "insect" and "insecticide" are used herein in their broad common usage to include spiders, mites, ticks, and like pests which are not in the strict biological sense classed as insects. Thus the usage herein conforms to the definitions provided by Congress in Public Law 104, the "Federal Insecticide, Fungicide, and Rodenticide Act" of 1947, Section 2, subsection $h$, wherein the term "insect" is used to refer not only to those small invertebrate animals belonging mostly to the class Insecta, comprising six-legged, usually winged forms, as beetles, bugs, bees, flies, and so forth, but also to other allied classes of arthropods whose members are wingless and usually have more than six legs, as spiders, mites, ticks, centipedes, and wood lice.

The phosphonothioates of this invention are effective against a wide variety of insect pests. As illustrative of their activity but not limitative thereof is the following:

*Contact Activity*

A rimless, 25 x 200 mm. culture tube is rinsed with acetone and is placed in a holding block. The tube is filled with 70 cc. of distilled water. Next 0.1 cc. of liquid or 0.1 gr. of solid test chemical is dissolved in acetone to make a 1% by weight concentrate of the test chemical. 0.07 ml. of this concentrate is pipetted into the culture tube containing the distilled water. The tube is then stoppered with an acetone washed rubber stopper and shaken vigorously to facilitate complete mixing. Approximately 25 early fourth instar yellow fever mosquito larvae (*Aedes aegypti*) are transferred to the tube with the aid of a pipette. The larvae are held in the test tube at room temperature for 24 hours at which time mortality observations are taken. This procedure is repeated at decreasing concentrations and a low concentration giving 100% mortality determined. The following results were obtained:

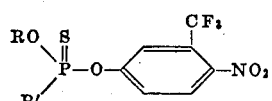

| Test Chemical | | Conc. giving 100% Mortality in p.p.m. |
|---|---|---|
| R' | R | |
| methyl | ethyl | 0.04 |
| Do | n-butyl | 0.016 |
| Do | cyclohexyl | 0.063 |
| Do | n-hexyl | 0.25 |
| Do | isopropyl | 0.063 |
| ethyl | ethyl | 0.032 |
| methyl | isobutyl | 0.03 |
| Do | n-propyl | 0.008 |
| Do | n-amyl | 0.03 |
| ethyl | n-butyl | 0.04 |
| methyl | phenyl | ¹ 0.04 |
| phenyl | ethyl | 0.03 |

¹ This concentration gave an 80% mortality.

*Activity on Insect Body*

A 1% by weight concentrate of the test chemical is prepared by dissolving the chemical in 10 ml. of acetone. A 0.25 cc. tuberculin, B.-D. Yale syringe is filled with the concentrate and placed in a microinjection apparatus. The injector lever is pressed several times to make certain that no air bubbles are trapped in the needle and the needle is wiped with filter paper to remove any excess solution. The injector lever is pressed once to produce one microliter which is applied directly to the ventral side of the abdomen of each of 10 plum Curculio, *Conotrachelus nenuphar*. After application each insect is released within observation dishes and held for 24 hours at room temperature and mortality observations made at the end of that time. This procedure is repeated at decreasing concentrations and the percent mortality at certain low concentrations determined. The following results were obtained:

| Test Chemical $\underset{R'}{\overset{RO}{>}}\overset{S}{\underset{\|}{P}}-O-\!\!\left\langle\!\!\begin{array}{c}CF_3\\ \end{array}\!\!\right\rangle\!\!-NO_2$ | | Activity | |
|---|---|---|---|
| R' | R | Conc. in percent by weight | Mortality, percent |
| methyl | n-butyl | 0.063 | 100 |
| Do | isopropyl | 0.25 | 100 |
| ethyl | ethyl | 0.063 | 100 |
| methyl | isobutyl | 0.06 | 100 |
| Do | n-propyl | 0.02 | 100 |
| Do | n-amyl | 0.3 | 100 |
| ethyl | n-butyl | 0.2 | 100 |
| methyl | phenyl | 0.2 | 100 |
| phenyl | ethyl | 0.3 | 60 |

Insect Feeding Activity

A 1% by weight concentrate is prepared by dissolving the test chemical in 10 ml. of acetone. A 0.25 cc. tuberculin, B.-D. Yale syringe is filled with this concentrate and placed in a microinjection apparatus. The injector lever is pressed several times to make certain no air bubbles are trapped in the needle and the needle is wiped with filter paper to remove excess solution. The injector lever is pressed once to produce one microliter which is applied directly to each of 12 lima bean leaf discs 0.25 inch in diameter. Single second instar southern armyworm larvate (*Prodenia eridania*) are placed on each disc and the disc encaged with a plastic cap. After 48 hours at room temperature mortality observations are made. This procedure is repeated at decreasing concentrations and the percent mortality at certain low concentrations determined. The results were as follows:

| Test Chemical $\underset{R'}{\overset{RO}{>}}\overset{S}{\underset{\|}{P}}-O-\!\!\left\langle\!\!\begin{array}{c}CF_3\\ \end{array}\!\!\right\rangle\!\!-NO_2$ | | Activity | |
|---|---|---|---|
| R' | R | Conc. in percent by weight | Mortality, percent |
| methyl | n-butyl | 0.063 | 100 |
| Do | cyclohexyl | 0.063 | 80 |
| Do | n-hexyl | 0.25 | 90 |
| Do | isopropyl | 0.25 | 100 |
| ethyl | ethyl | 0.063 | 100 |
| methyl | isobutyl | 0.06 | 100 |
| Do | n-propyl | 0.06 | 100 |
| ethyl | n-butyl | 0.02 | 80 |
| methyl | phenyl | 0.2 | 100 |
| phenyl | ethyl | 0.06 | 100 |

Although the phosphonothioates of this invention are useful per se in controlling a wide variety of insect pests, it is preferable that they be supplied to the pests or to the environment of the pest or pests in a dispersed form in a suitable extending agent.

In the instant specification and appended claims it is to be understood that the term "dispersed" is used in its widest possible sense. When it is said that the phosphonothioates of this invention are dispersed, it means that particles of the phosphonothioates of this invention may be molecular in size and held in true solution in a suitable organic solvent. It means further, that the particles may be colloidal in size and distributed throughout a liquid phase in the form of suspensions or emulsions or in the form of particles held in suspension by wetting agents. It also includes particles which are distributed in a semi-solid viscous carrier such as petrolatum or soap or other ointment base in which they may be actually dissolved in the semi-solid or held in suspension in the semi-solid with the aid of suitable wetting or emulsifying agents. The term "dispersed" also means that the particles may be mixed with and distributed throughout a solid carrier providing a mixture in particulate form, e.g. pellets, granules, powders, or dusts. The term "dispersed" also includes mixtures which are suitable for use as aerosols including solutions, suspensions, or emulsions of the phosphonothioates of this invention in a carrier such as dichloro-diffuoromethane and the like fluorochloroalkanes which boil below room temperature at atmospheric pressure.

In the instant specification and appended claims it is to be understood that the expression "extending agent" includes any and all of those substances in which the phosphonothioates of this invention are dispersed. It includes, therefore, the solvents of a true solution, the liquid phase of suspensions, emulsions or aerosols, the semi-solid carrier of ointments and the solid phase of particulate solids, e.g. pellets, granules, dusts and powders.

The exact concentration of the phosphonothioates of this invention employed in combatting or controlling insect pests can vary considerably provided the required dosage (i.e. toxic or lethal amount) thereof is supplied to the pests or to the environment of the pests. When the extending agent is a liquid or mixture of liquids (e.g. as in solutions, suspensions, emulsions, or aerosols) the concentration of the phosphonothioate employed to supply the desired dosage generally will be in the range of 0.001 to 50 percent by weight. When the extending agent is a semi-solid or solid, the concentration of the phosphonothioate employed to supply the desired dosage generally will be in the range of 0.1 to 25 percent by weight. From a practical point of view, the manufacturer must supply the agriculturist with a low-cost concentrate or spray base or particulate solid base in such form that, by merely mixing with water or solid extender (e.g. powdered clay or talc) or other low-cost material available to the agriculturist at the point of use, he will have an easily prepared insecticidal spray or particulate solid. In such a concentrate composition, the phosphonothioate generally will be present in a concentration of 5 to 95 percent by weight, the residue being any one or more of the well known insecticidal adjuvants, such as the various surface active agents (e.g. detergents, a soap or other emulsifying or wetting agent), surface-active clays, solvents, diluents, carrier media, adhesives, spreading agents, humectants, and the like.

These are a large number of organic liquids which can be used for the preparation of solutions, suspensions or emulsions of the phosphonothioates of this invention. For example, isopropyl ether, acetone, methyl ethyl ketone, dioxane, cyclohexanone, carbon tetrachloride, ethylene dichloride, tetrachloroethane, hexane, heptane and like higher liquid alkanes, hydrogenated naphthalenes, solvent naphtha, benzene, toluene, xylene, petroleum fractions (e.g. those boiling almost entirely under 400° F. at atmospheric pressure and having a flash point above about 80° F., particularly kerosene), mineral oils having an unsulfonatable residue above about 80 percent and preferably above about 90 percent. In those instances wherein there may be concern about the phytotoxicity of the organic liquid extending agent a portion of same can be replaced by such low molecular weight aliphatic hydrocarbons as dipentene, diisobutylene, propylene trimer, and the like or suitable polar organic liquids such as the aliphatic ethers and the aliphatic ketones containing not more than about 10 carbon atoms as exemplified by acetone, methyl ethyl ketone, diisobutyl ketone, dioxane, isopropyl ether, and the like. In certain instances, it is advantageous to employ a mixture of organic liquids as the extending agent.

When the phosphonothioates of this invention are to be supplied to the insect pests or to the environment of the pests as aerosols, it is convenient to dissolve them in a suitable solvent and disperse the resulting solution in dichlorodifluoromethane or like chlorofluoroalkane which boils below room temperature at atmospheric pressure.

The phosphonothioates of this invention are preferably supplied to the insect pests or to the environment of the insect pests in the form of emulsions or suspensions. Emulsions or suspensions are prepared by dispersing the phosphonothioate of this invention either per se or in the form of an organic solution thereof in water with the aid of a water-soluble surfactant. The term "surfactant" as employed here and in the appended claims is used as in volume II of Schwartz, Perry, and Berch's "Surface Active Agents and Detergents" (1958, Interscience Publishers, Inc., New York) in place of the expression "emulsifying agent" to connote generically the various "emulsifying agents," "dispersing agents," "wetting agents" and "spreading agents" that are adapted to be admixed with the active compounds of this invention in order to secure better wetting and spreading of the active ingredients in the water vehicle or carrier in which they are insoluble through lowering the surface tension of the water (see also Frear, "Chemistry of Insecticides, Fungicides and Herbicides," second edition, page 280). These surfactants include the well-known capillary-active substances which may be anion-active (or anionic), cation active (or cationic), or non-ionizing (or non-ionic) which are described in detail in volumes I and II of Schwartz, Perry, and Berch's "Surface Active Agents and Detergents" (1958, Interscience Publishers, Inc., New York) and also in the November 1947 issue of Chemical Industries (pages 811–824) in an article entitled "Synthetic Detergents," by John W. McCutcheon, and also in the July, August, September and October 1952 issues of Soap and Sanitary Chemicals under the title "Synthetic Detergents." The disclosures of these articles with respect to surfactants, i.e. the anion-active, cation-active and the non-ionizing capillary active substances, are incorporated in this specification by reference in order to avoid unnecessary enlargement of this specification. The preferred surfactants are the water-soluble anionic surface-active agents and the water soluble non-ionic surface-active agents set forth in U.S. 2,846,398 (issued August 5, 1958). In general it is preferred that a mixture of water-soluble anionic and water-soluble non-ionic surfactants be employed.

The phosphonothioates of this invention can be dispersed by suitable methods (e.g. tumbling or grinding) in solid extending agents either of organic or inorganic nature and supplied to the insect pests environment in particulate form. Such solid materials include for example, tricalcium phosphate, calcium carbonate, kaolin, bole, kieselguhr, talc, bentonite, fuller's earth, pyrophillite, diatomaceous earth, calcined magnesia, volcanic ash, sulfur and the like inorganic solid materials, and include for example, such materials of organic nature as powdered cork, powdered wood, and powdered walnut shells. The preferred solid carriers are the adsorbent clays, e.g. bentonite. These mixtures can be used for insecticidal purposes in the dry form, or, by addition of water-soluble surfactants or wetting agents the dry particulate solids can be rendered wettable by water so as to obtain stable aqueous dispersions or suspensions suitable for use as sprays.

For special purposes the phosophonothioates of this invention can be dispersed in a semi-solid extending agent such as petrolatum or soap (e.g. sodium stearate or oleate or palmitate or mixtures thereof) with or without the aid of solubility promotors and/or surfactants or dispersing agents.

In all of the forms described above the dispersions can be provided ready for use in combatting insect pests or they can be provided in a concentrated form suitable for mixing with or dispersing in other extending agents. As illustrative of a particularly useful concentrate is an intimate mixture of phosphonothioate of this invention with a water-soluble surfactant which lowers the surface tension of water in the weight proportions of 0.1 to 15 parts of surfactant with sufficient of the phosphonothioate of this invention to make 100 parts by weight. Such a concentrate is particularly adapted to be made into a spray for combatting various forms of insect pests by the addition of water thereto. As illustrative of such a concentrate is an intimate mixture of 95 parts by weight of O-(n-butyl) O-(3-trifluoromethyl-4-nitrophenyl) methylphosphonothioate and 5 parts by weight of a water-soluble non-ionic surfactant such as the polyoxyethylene derivative of sorbitan monolaurate.

Another useful concentrate adapted to be made into a spray for combatting a variety of insect pests is a solution (preferably as concentrated as possible) of a phosphonothioate of this invention in an organic solvent therefor. The said liquid concentrate preferably contains dissolved therein a minor amount (e.g. 0.5 to 10 percent by weight of the new insecticidal agent) of a surfactant (or emulsifying agent), which surfactant is also water-soluble. As illustrative of such a concentrate is a solution of O-(n-propyl) O-(3-trifluoromethyl-4-nitrophenyl) methylphosphonothioate in benzene which solution contains dissolved therein a water-soluble polyoxyethylene glycol non-ionic surfactant and a water-soluble alkylaryl sulfonate anionic surfactant.

Of the surfactants aforementioned in preparing the various emulsifiers, wettable or dispersible compositions or concentrates of this invention, the anionic and non-ionic surfactants are preferred. Of the anionic surfactants, the particulyarly preferred are the well known water-soluble alkali metal alkylaryl sulfonates as exemplified by sodium decylbenzene sulfonate and sodium dodecylbenzene sulfonate. Of the non-ionic surfactants, the particularly preferred are the water-soluble polyoxyethylene derivative of alkylphenols (particularly isooctylphenol) and the water-soluble polyoxyethylene derivatives of the mono-higher fatty acid esters of hexitol anhydrides (e.g. sorbitan). These materials in general contain 15 to 30 moles of ethylene oxide per mole of the hexitol anhydride or the alkylphenol.

In all of the various dispersions described hereinbefore for insecticidal purposes, the active ingredient can be one or more of the compounds of this invention. The compounds of this invention can also be advantageously employed in combination with other pesticides, including for example, nematocides, bactericides, and herbicides. In this manner it is possible to obtain mixtures which are effective against a wide variety of pests and other forms of noxious life.

In controlling or combatting insect pests the phosphonothioates of this invention either per se or compositions comprising same are supplied to the insect pests or to their environment in a lethal or toxic amount. This can be done by dispersing the new insecticidal agent or insecticidal composition comprising same in, on or over an infested environment or in, on or over an environment the insect pests frequent, e.g. agricultural soil or other growth media or other media infested with insect pests or attractable to the pests for habitational or sustenance or propagational purposes, in any conventional fashion which permits contact between the insect pests and the phosphonothioates of this invention. Such dispersing can be brought about by applying sprays or particulate solid compositions to a surface infested with the insect pests or attractable to the pests, as for example, the surface of an agricultural soil or other media such as the above ground surface of plants by any of the conventional methods, e.g. power dusters, boom and hand sprayers, and spray dusters. Also for sub-surface application such dispersing can be carried out by simply mixing the new insecticidal agent per se or insecticidal spray or particulate solid compositions comprising same with the infested environment or with the environment the insect pests frequent, or by employing a liquid carrier for the new insecticidal agent to accomplish sub-surface penetration and impregnation therein.

While this invention has been described with respect to certain embodiments, it is to be understood that it is not so limited and that variations and modifications thereof obvious to those skilled in the art can be made without departing from the spirit and scope thereof.

What is claimed is:

1. An O-(aryl) phosphonothioate of the formula

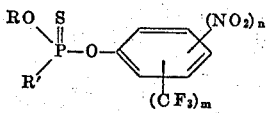

wherein *m* and *n* are whole numbers from 1 to 2 and wherein the sum of *m* and *n* is a whole number from 2 to 3, wherein R' is a hydrocarbyl radical containing from 1 to 8 carbon atoms and which is free of olefinic and acetylenic unsaturation, and wherein R is a hydrocarbon radical containing 1 to 8 carbon atoms.

2. An O-(4-nitro - 3 - trifluoromethylphenyl) phosphonothioate of the formula

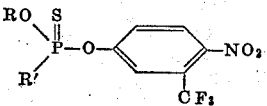

wherein R' is an alkyl radical containing from 1 to 4 carbon atoms, and wherein R is an aliphatic hydrocarbon radical containing from 1 to 5 carbon atoms, the alpha-carbon of said R having two hydrogen substituents.

3. An O-(4-nitro - 3 - trifluoromethylphenyl) phosphonothioate of the formula

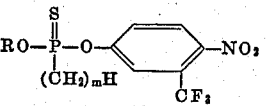

wherein *m* is a whole number from 1 to 2, and wherein R is an alkyl radical containing from 2 to 4 carbon atoms, the alpha-carbon of said R having two hydrogen substituents.

4. O-(ethyl) O-(4-nitro-3-trifluoromethylphenyl) ethylphosphonothioate.

5. O-(n-butyl) O-(4-nitro - 3 - trifluoromethylphenyl) methylphosphonothioate.

6. O-(isobutyl) O-(4-nitro - 3 - trifluoromethylphenyl) methylphosphonothioate.

7. O-(n-propyl) O-(4-nitro - 3 - trifluoromethylphenyl) methylphosphonothioate.

8. The method which comprises reacting

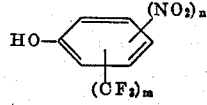

wherein *m* and *n* are whole numbers from 1 to 2 and wherein the sum of *m* and *n* is a whole number from 2 to 3 with

wherein Z is a halogen of atomic number in the range of 16 to 36, wherein R' is a hydrocarbyl radical containing 1 to 8 carbon atoms and is free of olefinic and acetylenic unsaturation, wherein R is a hydrocarbon radical containing 1 to 8 carbon atoms, in the presence of a hydrogen halide scavenging agent.

9. The method which comprises reacting 4-nitro-3-trifluoromethylphenol with

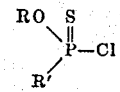

wherein R' is an alkyl radical containing 1 to 4 carbon atoms and wherein R is an aliphatic hydrocarbon radical containing from 1 to 5 carbon atoms, the alpha-carbon of said R containing two hydrogen substituents, in the presence of a hydrogen chloride scavenging agent.

10. The method which comprises reacting 4-nitro-3-trifluoromethylphenol with

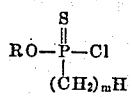

wherein *m* is a whole number from 1 to 2 and wherein R is an alkyl radical containing from 2 to 4 carbon atoms, the alpha-carbon atom of said R containing two hydrogen substituents.

11. An insecticidal composition comprising a compound of claim 1 dispersed in an extending agent.

12. An insecticidal composition comprising a compound of claim 1 dispersed in an extending agent selected from the group consisting of solid and semi-solid extending agents, the composition containing 0.1 to 25 percent by weight of said compound of claim 1.

13. An insecticidal composition comprising a compound of claim 1 dispersed in a liquid extending agent, the composition containing 0.001 to 50 percent by weight of said compound of claim 1.

14. An insecticidal concentrate comprising a compound of claim 2 and an insecticidal adjuvant, said concentrate containing from 5 to 95 percent by weight of the compound of claim 2.

15. An insecticidal concentrate comprising a compound of claim 2 dispersed in an organic solvent therefor and having dissolved therein a minor amount of a surfactant, said concentrate forming an emulsion with water upon agitation therewith.

16. An insecticidal concentrate adapted to be made into a sprayable composition by the addition of water comprising a compound of claim 2 in admixture with a water-soluble surfactant in the weight proportion of 0.1 to 15 parts of surfactant and sufficient of said compound of claim 2 to make 100 parts by weight.

17. The method of controlling insects which comprises contacting the insects with a toxic amount of at least one compound of claim 1.

18. The method for protection of plants against insect attack which comprises applying to the plant an insecticidal amount of at least one compound of claim 1.

19. The method of controlling insects which comprises contacting the insects with a toxic amount of at least one compound of claim 2.

20. The method for protection of plants against insect attack which comprises applying to the plant an insecticidal amount of at least one compound of claim 2.

References Cited in the file of this patent

UNITED STATES PATENTS

| | | |
|---|---|---|
| 2,795,598 | Scherer | June 11, 1958 |
| 2,890,235 | Raley | June 9, 1959 |

FOREIGN PATENTS

| | | |
|---|---|---|
| 814,152 | Germany | Sept. 20, 1951 |
| 667,591 | Great Britain | Mar. 5, 1952 |